US009560572B2

United States Patent
Kalhan

(10) Patent No.: US 9,560,572 B2
(45) Date of Patent: Jan. 31, 2017

(54) HANDOVERS IN WIRELESS COMMUNICATION SYSTEMS WITH HIERARCHICAL CELLS USING DIFFERENT TRANSMISSION TIME PERIODS FOR UPLINK COMMUNICATION

(75) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 818 days.

(21) Appl. No.: 13/305,563

(22) Filed: Nov. 28, 2011

(65) Prior Publication Data

US 2013/0136103 A1    May 30, 2013

(51) Int. Cl.
*H04W 4/00* (2009.01)
*H04W 36/32* (2009.01)
*H04W 36/04* (2009.01)

(52) U.S. Cl.
CPC ............. *H04W 36/32* (2013.01); *H04W 36/04* (2013.01)

(58) Field of Classification Search
CPC ........... H04W 84/02; H04Q 7/38; H04B 7/212
USPC ............... 370/331, 338, 330, 458; 455/456.2
See application file for complete search history.

(56) References Cited

U.S. PATENT DOCUMENTS

| | | | | |
|---|---|---|---|---|
| 5,499,386 A | * | 3/1996 | Karlsson | H04W 36/04 455/437 |
| 5,548,812 A | * | 8/1996 | Padovani et al. | 455/442 |
| 5,577,022 A | * | 11/1996 | Padovani | H04B 1/707 370/332 |
| 5,960,352 A | * | 9/1999 | Cherpantier | 455/451 |
| 6,504,837 B1 | * | 1/2003 | Menzel | H04B 7/022 370/337 |
| 6,810,252 B1 | | 10/2004 | Kwon | |
| 6,920,324 B2 | * | 7/2005 | Atarius et al. | 370/331 |
| 7,006,473 B2 | * | 2/2006 | Zhao | 370/332 |
| 7,853,215 B2 | * | 12/2010 | Kurek et al. | 455/67.11 |
| 7,969,930 B2 | * | 6/2011 | Kalhan | 370/328 |
| 8,189,626 B2 | * | 5/2012 | Gopal et al. | 370/509 |
| 8,213,994 B2 | * | 7/2012 | Cave et al. | 455/562.1 |
| 8,289,928 B2 | * | 10/2012 | Lee et al. | 370/331 |
| 8,477,742 B2 | * | 7/2013 | Grilli et al. | 370/336 |
| 8,483,184 B2 | * | 7/2013 | Yokoyama et al. | 370/332 |
| 8,493,848 B2 | * | 7/2013 | Matsuzawa | 370/230 |

(Continued)

FOREIGN PATENT DOCUMENTS

WO    2004/054153 A2    6/2004
WO    2008/066927 A2    6/2008

*Primary Examiner* — Ricky Ngo
*Assistant Examiner* — Dewanda Samuel

(57) ABSTRACT

An originating transceiver node provides wireless service to a wireless communication device that is transmitting uplink signals within originating uplink time periods assigned to the originating transceiver node. A target transceiver node is assigned target uplink time periods for uplink communication from wireless communication devices receiving wireless service from the target transceiver node where the target uplink time periods are different from the originating uplink time periods. The target transceiver node monitors the originating uplink time periods and transmits a message if an uplink signal is received within an originating uplink time slot. In some circumstances, the target transceiver node sends the message only if a determination is made that the wireless communication device transmitting the uplink signal has a proximity to the target transceiver node that is less than a threshold.

14 Claims, 5 Drawing Sheets

(56) References Cited

U.S. PATENT DOCUMENTS

| | | | |
|---|---|---|---|
| 8,599,880 B1* | 12/2013 | Srinivas | H04W 36/04 370/216 |
| 8,599,882 B2* | 12/2013 | Sahara | 370/503 |
| 2004/0057398 A1* | 3/2004 | Black | 370/321 |
| 2004/0116133 A1 | 6/2004 | Kalhan et al. | 455/456.2 |
| 2005/0286449 A1* | 12/2005 | Seo et al. | 370/280 |
| 2006/0025138 A1* | 2/2006 | Kotzin | H04W 36/0066 455/445 |
| 2007/0076696 A1* | 4/2007 | An | H04L 29/06027 370/352 |
| 2008/0019320 A1* | 1/2008 | Phan et al. | 370/331 |
| 2008/0311914 A1 | 12/2008 | Tinnakornsrisuphap et al. | |
| 2009/0098873 A1 | 4/2009 | Gogic | |
| 2009/0129341 A1 | 5/2009 | Balasubramanian et al. | |
| 2009/0257398 A1* | 10/2009 | Koyanagi | H04W 48/18 370/331 |
| 2009/0264077 A1 | 10/2009 | Damnjanovic | |
| 2009/0290555 A1* | 11/2009 | Alpert et al. | 370/331 |
| 2009/0312024 A1 | 12/2009 | Chen et al. | |
| 2010/0135249 A1* | 6/2010 | Meyer | H04W 36/02 370/331 |
| 2010/0151858 A1 | 6/2010 | Brisebois et al. | |
| 2010/0167748 A1* | 7/2010 | Lim et al. | 455/450 |
| 2010/0173663 A1* | 7/2010 | Umeda | 455/522 |
| 2011/0026492 A1 | 2/2011 | Frenger et al. | |
| 2011/0032907 A1* | 2/2011 | Sahara | 370/331 |
| 2011/0065438 A1 | 3/2011 | Bergman et al. | |
| 2011/0237329 A1* | 9/2011 | Evans | A63F 13/12 463/30 |
| 2011/0263260 A1* | 10/2011 | Yavuz et al. | 455/437 |
| 2011/0299446 A1* | 12/2011 | Chun | H04W 36/04 370/311 |

* cited by examiner

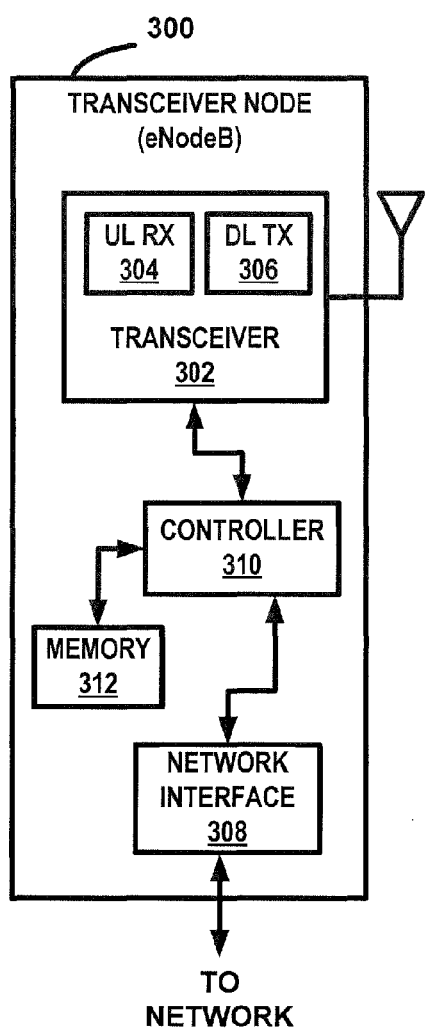
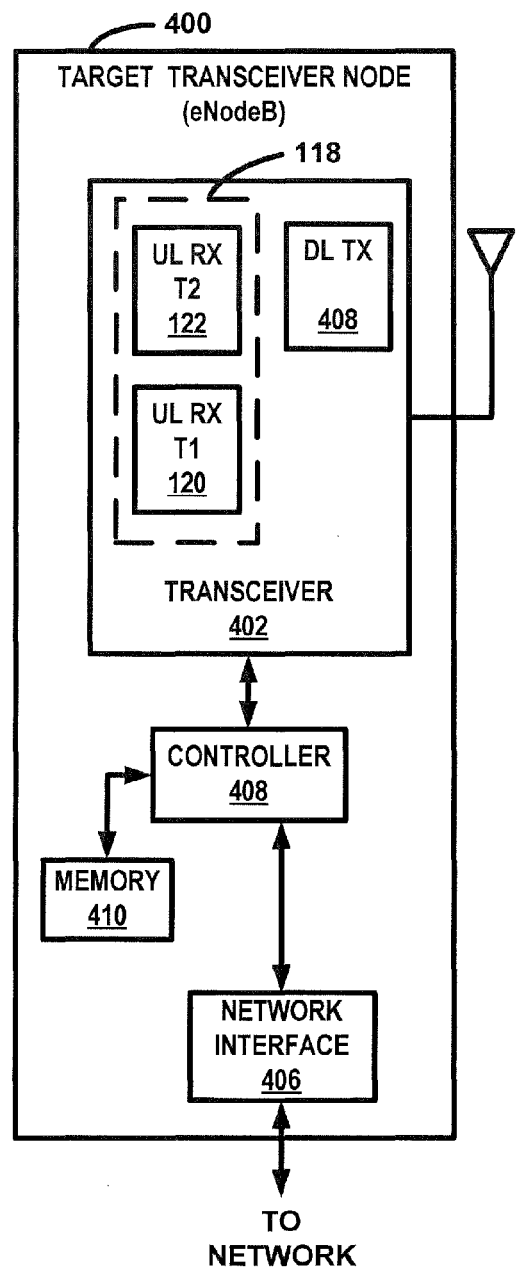
FIG. 3
FIG. 4

# HANDOVERS IN WIRELESS COMMUNICATION SYSTEMS WITH HIERARCHICAL CELLS USING DIFFERENT TRANSMISSION TIME PERIODS FOR UPLINK COMMUNICATION

BACKGROUND

The invention relates in general to wireless communication systems and more specifically to detection of wireless communication device in systems using time division multiplexing (TDM) between cells.

Wireless communication systems may include transceiver nodes, sometimes referred to as base stations or access nodes, to establish communication links to portable wireless communication devices. Each transceiver node transmits a pilot signal which is received by a wireless communication device. Pilot signals assist the wireless communication devices in communicating with the transceiver nodes. A pilot signal may be a dedicated single frequency carrier or may be a dedicated channel that is a portion of a carrier. For example, a pilot signal may be one or more time slots at a particular frequency spread by a particular code. In order to receive wireless service from a particular transceiver node, the wireless communication device must adequately receive the pilot signal transmitted by the transceiver node. In order to be handed off to a new transceiver node, a wireless communication device must first receive the pilot signal transmitted by the transceiver node. In conventional systems, the wireless communication device, at least occasionally, searches for new pilot signals while communicating with a transceiver node. Often a wireless communication device includes a list of pilot signals that can be searched. Such a list may include pilot frequencies, PN offsets, and other information identifying a pilot signal corresponding to a transceiver node that may be available for providing wireless service to the wireless communication device.

SUMMARY

An originating transceiver node provides wireless service to a wireless communication device that is transmitting uplink signals within originating uplink time periods assigned to the originating transceiver node. A target transceiver node is assigned target uplink time periods for uplink communication from wireless communication devices receiving wireless service from the target transceiver node where the target uplink time periods do not overlap with the originating uplink time periods. The target transceiver node monitors the originating uplink time periods and transmits a message if an uplink signal is received within an originating uplink time slot. In some circumstances, the target transceiver node sends the message only if a determination is made that the wireless communication device transmitting the uplink signal has a proximity to the target transceiver node that is less than a threshold.

BRIEF DESCRIPTION OF THE DRAWINGS

FIG. 3 is a block diagram of a transceiver node suitable for use as the originating transceiver node.

FIG. 4 is block diagram of a transceiver node suitable for use as the target transceiver node.

DETAILED DESCRIPTION

Figure 1A:
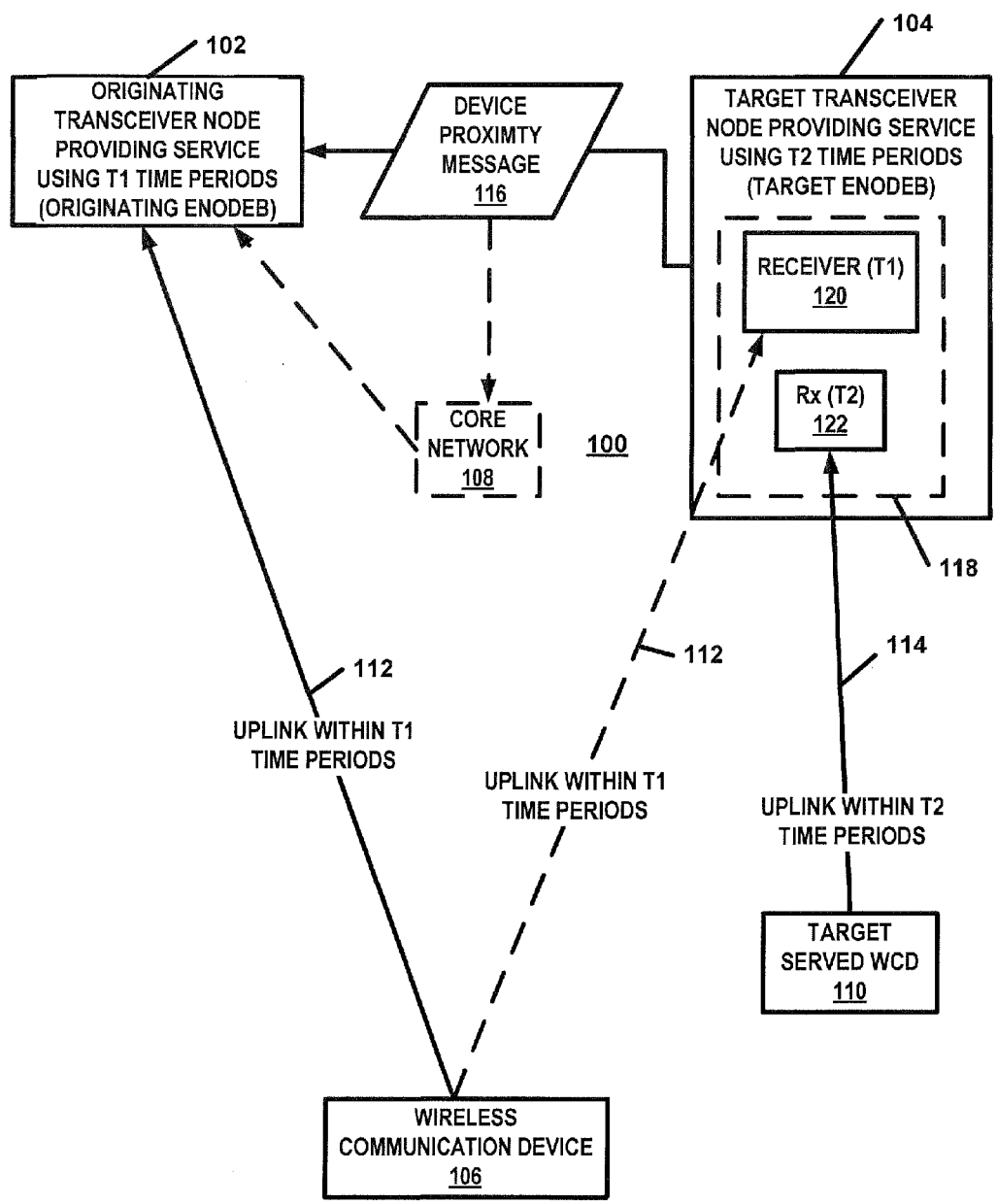
FIG. 1A is a block diagram of a communication system that includes at least an originating transceiver node, a target transceiver node and a wireless communication device.

As described above, wireless communication devices in many systems must receive the pilot signal transmitted from a transceiver node in order to acquire wireless service from the transceiver node. In conventional systems, the wireless communication device searches for pilot signals transmitted by transceiver nodes in order to find a transceiver node that will provide better service or at least can provide alternate service. Identifying available transceiver nodes facilitates handovers between cells which occurs when the wireless communication device is in motion and travels outside the current service cell. Handovers are also useful or required during other situations such as, for example, situations where a different level or different cost of service is desired, changes in transceiver node communication traffic, and changes in environmental conditions. Advantages of the embodiments discussed herein include minimizing pilot signal searches and improvement of handover success rates. Target transceiver nodes are identified as at least possibly being capable of providing service to the wireless communication device based on known or estimated locations of the wireless communications device and the target transceiver nodes. In some situations, the location of the wireless communication device is determined by conventional techniques such as Global Positioning System and/or triangulation techniques. In some situations, the location of the wireless communication device may be determined based on the identification of pilot signals that the wireless communication device is able to receive. For example, the location may be at least estimated when the wireless communication device reports a strong pilot signal from a neighboring cell. Advantages may be more easily realized within particular types of systems, configurations, and deployments. Systems employing Hierarchical Cell Structure (HCS) techniques, for example, may include smaller cells using time periods different than the time periods used in the larger cells to serve their respective users. An example of a time period is a time slot. A transceiver node providing service within a large cell may apply information regarding the locations of the smaller cells and the location of the wireless communication device to identify small cell transceiver nodes that may be able to provide service to the wireless communication device. These small cell transceiver nodes are informed of the wireless communication device uplink time periods allowing the small cell transceiver nodes to search for the wireless communication device. If a wireless communication device is detected by one or more of the small cell transceiver nodes, the wireless communication device can be configured, or otherwise instructed, to search for the pilot signals of the small cell transceiver nodes.

As discussed below in further detail, a target transceiver node monitors originating uplink time periods assigned to an originating transceiver node for uplink transmissions from wireless communication devices receiving wireless communication service from the originating transceiver node. After detecting a signal in the originating uplink time slot, in at least one embodiment, the target transceiver node estimates the proximity of the wireless communication device transmitting the uplink signal. If the wireless communication device is sufficiently close to the target transceiver node, the target transceiver node sends a message to the originating transceiver node that at least identifies the wireless communication device. In some circumstances, the message is sent when the uplink signal is detected. The message may be transmitted directly to the originating transceiver node or may be sent to the core network which invokes transmission of a message to the originating transceiver node. In response to the message, the originating transceiver node instructs the wireless communication device to measure the pilot signal strength of the pilot signal transmitted from the target transceiver node. Based on at least the reported pilot signal strength, a handover decision is made. The originating transceiver initiates a handover of the wireless communication device from the originating transceiver node to the target transceiver node in the appropriate circumstances.

FIG. 1A is a block diagram of a communication system 100 that includes at least an originating transceiver node 102, a target transceiver node 104, and a wireless communication device 106. For the examples, the wireless communication system 100 operates in accordance with 3rd Generation Partnership Project (3GPP) Long Term Evolution (LTE) standards and techniques. As is known, the LTE air interface utilizes Orthogonal Frequency-Division Multiple Access (OFDMA) in the downlink and Single-carrier FDMA (SC-FDMA) (DFTS-FDMA) in the uplink to efficiently support multi-antenna technologies such as multiple-input-multiple output (MIMO) schemes. Other standards, modulation schemes, protocols and communication techniques may be used in some circumstances. The transceiver nodes 102, 104 are eNodeB (evolved Node B) base stations for the example. The transceiver nodes, however, can be any type of base station, transceiver, access point, or wireless communication equipment that can perform the functions described herein. As discussed below with reference to FIG. 1B and FIG. 1C, the originating transceiver node 102 may be connected directly to the target transceiver node 104 and/or other transceiver nodes through a communication link that allows direct communication between the transceiver nodes. An example of such a direct communication link is a communication link that supports X2 messaging. In an example where a connection supporting direct communication between the transceiver nodes is not available, communication between the transceiver nodes 102, 104 is accomplished using S1 signaling through a core network 108, which typically includes a mobility management entity (MME) and other entities. In accordance with known techniques, the transceiver nodes communicate with the MME in the core network 108 using S1 Control messages.

Wireless communication resources in the system 100 are managed such that wireless communication devices 106, 110 transmit uplink signals 112, 114 within assigned time intervals referred to as time periods. Each transceiver node in the communication system is assigned time periods for receiving uplink signals 112, 114 from wireless communication devices 106, 110 that are being served by the particular transceiver node. The time periods assigned to the originating transceiver node 102 are different from the time periods assigned to the target transceiver node 104 and, therefore, do not coincide or overlap. Accordingly, wireless communication devices, such as the wireless communication device 106, receiving wireless service from the originating transceiver node 102 do not transmit uplink signals at the same frequency and at the same time that wireless communication devices 110 receiving wireless service from the target transceiver node 104 transmit uplink signals. Wireless communication devices receiving wireless service from the target transceiver node 104 are referred to herein as target served wireless communication devices 110. The communication resources (i.e. frequency bands and time periods) are assigned to the transceiver nodes in accordance with known techniques. If different frequencies are used for uplink signals by wireless communication devices within different service areas, the uplink signals may be transmitted at the same time in some situations.

For the examples described herein, the target transceiver node 104 searches for wireless communication devices 106 communicating with the originating transceiver node 102 by receiving signals 112 within the time periods (T1 time periods) assigned to the originating transceiver node 102 for uplink signals. After detecting uplink signals transmitted within the time periods (T1 time periods) by a wireless communication device 106, the target transceiver node 104 determines whether the wireless communication device 106 is at least likely to be within service range of the target transceiver node 104. The proximity, therefore, is estimated or determined to some level of certainty. If the proximity of the wireless communication device 106 is below a threshold, the target transceiver node 104 notifies the originating transceiver 102, either directly or through the MME, by sending a device proximity message 116. A handover decision is made and, if warranted, a handover of the wireless communication device 106 from the originating transceiver node 102 to the target transceiver node 104 is executed in accordance with known techniques. Although the proximity may be calculated, estimated or otherwise determined in other ways, examples of suitable techniques are described in U.S. patent application Ser. No. 11/565,323 entitled "DETECTION OF A MULTI-MODE PORTABLE COMMUNICATION DEVICE AT A MESH NETWORK", filed on Nov. 30, 2006 and incorporated by reference in its entirety herein. Although in the examples discussed, the proximity is calculated or estimated by the target transceiver node 104, the proximity may be determined by another system entity in some situations. Therefore, in some situations, the device proximity message 116 may sent in response to detecting the uplink signal 112 without calculating the proximity.

As discussed above, the device proximity message may be sent directly to the originating transceiver node 102 using an X2 link, for example, or may be sent to the core networks and forwarded to the originating transceiver node using S1 messages, for example. In FIG. 1, the box representing the core network 108, as well as the lines representing the transmission of the device proximity message 116, are drawn with dashed lines to illustrate that in some circumstances, the device proximity message 116 is transmitted through the core network 108 while, in other circumstances, the device proximity message is sent directly to the originating transceiver node 102.

The device proximity message 116 in the example is sent when the proximity is less than a threshold. The device proximity message 116 may provide proximity information in some circumstances where the information may be used by an MME (or other entities in the core network 108) to determine whether the wireless communication device 106 should search for the target transceiver node 104. The device proximity message 108 may also include other information such as, for example, characteristics of the received uplink signal. Such characteristics may allow for another entity in the system 100 to estimate or determine the proximity of the wireless communication device 106 to the target transceiver node 104. For the described examples, the device proximity message 116 includes only a device identifier that identifies the wireless communication device 106 detected by the target transceiver node 104.

A receiver 118 in the target transceiver node 104 is capable of receiving uplink signals 112 transmitted with the T1 timing (within the T1 time periods) and uplink signals 114 transmitted with the T2 timing (within the T2 time periods). Although two receivers may be used in some situations, the receiver 118 is a single device with the capability of receiving the T1 and T2 uplink signals in the example. For the example, therefore, blocks with reference numbers 120 and 122 represent receiver functions within a single receiver 118 although the blocks may represent different receivers in some circumstances. FIG. 1 shows a T1 receiver function 120 for receiving uplink signals 112 in T1 time periods and a T2 receiver function 122 for receiving uplink signals 114 in T2 time periods.

Figure 1B:
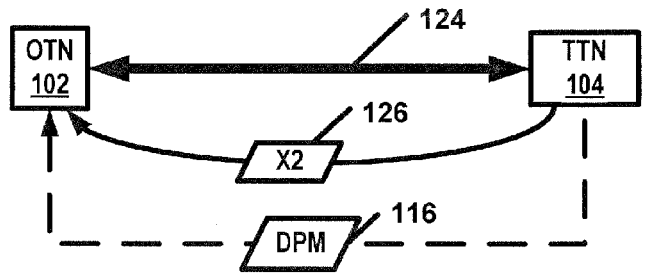
FIG. 1B is a block diagram of the wireless communication system that includes a direct communication link supporting direct communication between the originating transceiver node and the target transceiver node.

FIG. 1B is a block diagram of the wireless communication system 100 that includes a direct communication link 124 between the originating transceiver node 102 and the target transceiver node 104 that supports direct communication between the transceiver nodes 102, 104. For the exemplary system 100 in FIG. 1B, the device proximity message 116 is transmitted directly to the originating transceiver node 104 through the direct communication link 124 by sending an X2 message 126. The X2 message 126 is generated and transmitted by the target transceiver node 102 in accordance with the 3GPP LTE protocol. Other types of signaling may be used depending on the particular system 100 and protocols.

Figure 1C:
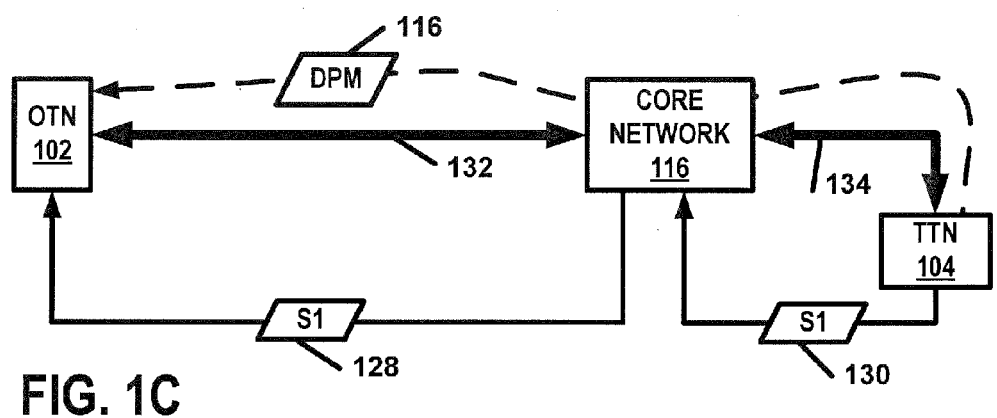
FIG. 1C is a block diagram of the wireless communication system where no direct communication link allowing direct communication between the transceiver nodes connects the originating transceiver node and the target transceiver node.

FIG. 1C is a block diagram of the wireless communication system 100 where no direct communication link connects the originating transceiver node 102 and the target transceiver node 104. Accordingly, the transceiver nodes 102, 104 are not able to communicate directly with each other. The device proximity message 116 is sent to the originating transceiver node 104 by sending an S1 message 128 to the core network 108 which then sends another S1 message 130 to the target transceiver node 104. The core network 108 is connected to the originating transceiver node 102 through a direct communication link 132 and to the target transceiver node 104 through another direct communication link 134 where the direct communication links 132, 134 support communication between the core network 108 and each transceiver node 102, 104. For the example, therefore, the communication links 132, 134 support S1 messaging. For the example of FIG. 1C, the MME in the core network receives, processes, and transmits S1 messages.

Figure 2:
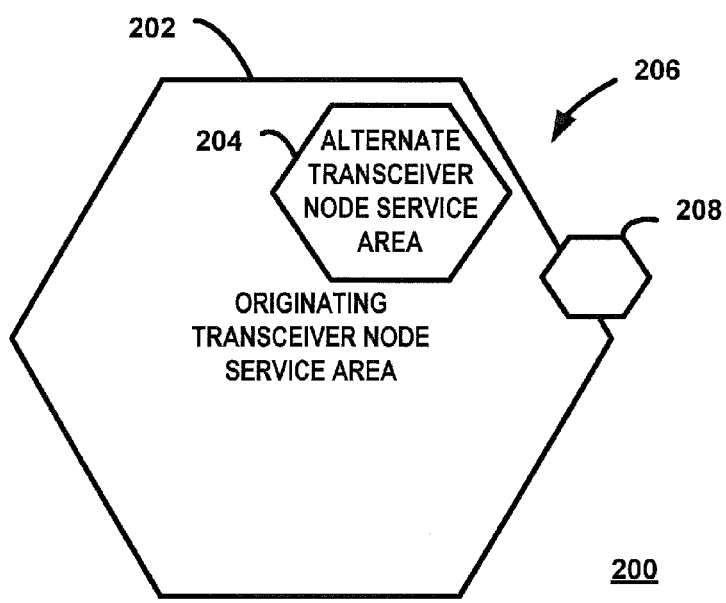
FIG. 2 is an illustration of an arrangement of an exemplary geographical service area relationship provided by the originating transceiver node and the target transceiver node.

FIG. 2 is an illustration of an arrangement of an exemplary geographical service area relationship 200 provided by the originating transceiver node 102 and the target transceiver node 104. An originating transceiver node 102 geographical service area (originating service area) 202 is provided by the originating transceiver node 102. A target transceiver node geographical service area (target service area) 204 is provided by the target transceiver node 104. The target service area 204 may be one of a plurality of target service areas 206 that are positioned within, or at least overlapping with, the originating service area 202. The plurality of target service areas 206, therefore, may include a service area 208 that overlaps the originating service area 202.

The service areas 202, 204, 208 may have any of several shapes, sizes, and configurations. Accordingly, the hexagons representing the service areas generally illustrate the relationships between the service areas and do not necessarily depict the actual shapes of the service areas. Further, the service areas may contain holes of coverage where service is unavailable. In the interest of clarity and brevity, such features are not illustrated in the FIG. 2. The exemplary arrangement shown in the figure corresponds to a hierarchical cell system where the target service areas 204 (206) are provided by small cell base stations (eNodeBs) that are smaller than the larger service areas provided by larger cell base stations (eNodeBs). For example, the originating transceiver node 102 may be a macrocell eNodeB and the target transceiver nodes 104 may be microcell, picocell, or femtocell eNodeBs.

Base stations or eNodeBs in cellular communication systems provide communications services to wireless communication devices within geographical cells where each base station exchanges signals with wireless communication devices within an associated cell. The size and shape of each cell is determined by several factors and are at least partially based on design parameters of the base station (eNodeB). In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, improved coverage, higher user capacity for the area, additional service features, and/or improved quality of service. Femtocell base stations provide communications services to relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. Accordingly, the user device (wireless communication device), such as a handset, wireless personal digital assistant (PDA) or other such portable device, must acquire the pilot signal from the femtocell to acquire service.

Where the target service areas are femtocells, therefore, a femtocell eNodeB or base station (transceiver node 104) may be located at a residence where the femtocell is a service area for devices used by device users living at the residence. When the wireless communication devices are outside the service area 204, service is provided by larger macrocells (202). When the authorized wireless communication device 106 is at the residence, however, service is provided by the transceiver node 104 presenting the smaller femtocell service area 204. In some situations, the service area 204 of the target transceiver node 104 will be completely within a larger service area. In other situations, however, the service area 204 may be partially overlapping with the service area 202.

FIG. 3 is a block diagram of a transceiver node 300 suitable for use as the originating transceiver node 102. The transceiver node 300 may be any combination of electronics including hardware, software, and/or firmware to perform the described functional blocks. The various functions and operations of the blocks described with reference to the transceiver node 300 may be implemented in any number of devices, circuits, or elements. Two or more of the functional blocks may be integrated in a single device and the functions described as performed in any single device may be implemented over several devices. For example, at least portions of the functions of the transceiver may be performed by the controller. The controller may include a separate memory in some circumstances.

A transceiver 302 is configured to exchange wireless signals with one or more wireless communication devices (106) and includes a receiver 304 for receiving uplink signals and a transmitter 306 for transmitting downlink signals. The downlink signal frequency used for a particular wireless communication device 106 may be the same as the uplink frequency where TDD techniques are used. Where FDD techniques are employed, the particular downlink frequency is paired with the uplink frequency for the particular communication device. A network interface 308 is connected to the system infrastructure and facilitates communication with other transceiver nodes and/or the core network 108. A controller 310 is any processor, microprocessor, processor arrangement, or computer that can execute code to perform the functions described herein and to facilitate the overall operation of the transceiver node 300. The memory 312 may by any combination of persistent and temporary memory suitable to store information and data.

FIG. 4 is block diagram of a transceiver node 400 suitable for use as the target transceiver node 104. The transceiver node 400 may be any combination of electronics including hardware, software, and/or firmware to perform the described functional blocks. The various functions and operations of the blocks described with reference to the transceiver node 400 may be implemented in any number of devices, circuits, or elements. Two or more of the functional blocks may be integrated in a single device and the functions described as performed in any single device may be implemented over several devices. For example, at least portions of the functions of the transceiver may be performed by the controller. The controller may include a separate memory in some circumstances.

A transceiver 402 is configured to exchange wireless signals with one or more wireless communication devices (106) and includes a receiver 118 for receiving uplink signals and a transmitter 604 for transmitting downlink signals. The receiver 118 is capable of receiving uplink signals within two different sets of time periods and, therefore, can be considered as a single device with such capability or may be a device that includes two uplink receivers. For the example, the transceiver 602 includes two uplink receivers where the first timing (T1) receiver 120 can receive uplink signals transmitted within the first time periods assigned to the originating transceiver node 102 and the second timing receiver 122 is configured to receive uplink signals within second time periods assigned to the target transceiver node 104. The downlink transmitter 604 transmits a pilot signal as well as transmitting other downlink signals. When providing wireless service, the transceiver node 400 receives and transmits signals within time periods assigned to the target transceiver node 104. Accordingly, the second timing receiver 122 is used for receiving uplink signals from wireless communication devices 110 communicating with the transceiver node 400 and receiving wireless service within the target service area 204. The first timing receiver 120 monitors the uplink frequencies used by wireless communication devices communicating with the originating transceiver node 102.

A network interface 406 is connected to the system infrastructure and facilitates communication with other transceiver nodes and/or the core network 108. The controller 408 is any processor, microprocessor, processor arrangement, or computer that can execute code to perform the functions described herein and to facilitate the overall operation of the transceiver node 400. The memory 410 may by any combination of persistent and temporary memory suitable to store information and data.

Wireless communication device identifiers (IDs) of wireless communication devices that are receiving service from the originating transceiver node 102 are stored in the memory 410. In the example, the IDs are received through the network interface 406 from the core network 108. In some circumstances, however, the IDs may be received from the originating transceiver node 102. In some circumstances, as soon as a wireless communication device enters the originating coverage area, the originating base station can share the wireless communication device ID with all the near-by target base stations.

Figure 5:
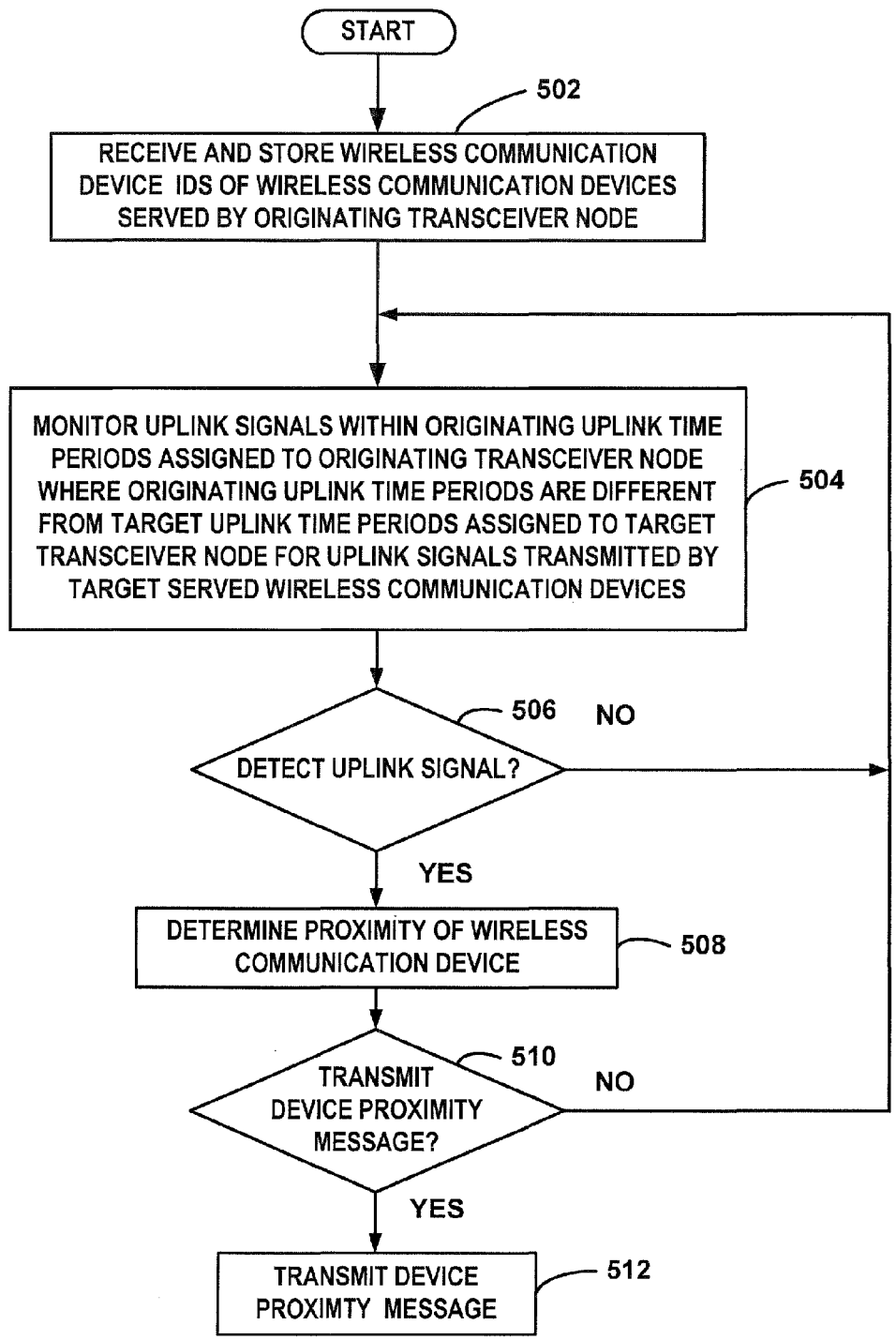
FIG. 5 is a flow chart of a method performed at a target transceiver node.

FIG. 5 is flow chart of a method performed at a target transceiver node 102. The method may be performed by any combination of software, firmware, and hardware. In some circumstances, the steps described in the flow chart may be performed in a different order than shown and two or more steps may be combined in a single step.

At step 502, the wireless communication device IDs are received and stored in the memory.

At step 504, the wireless channel using the originating time periods (T1 time periods) is monitored for the uplink signals 112. The originating uplink time periods that are assigned to the originating transceiver node are monitored by the target transceiver node 104. As explained above, the originating uplink timeslots are different from the target uplink timeslots that are assigned to the target transceiver node 104 for uplink communication with wireless communication devices 110 served by the target transceiver node 104. The uplink receiver 118 is configured to receive uplink signals with T1 timing. As described above, a separate receivers 120, 122 may be used to receive the uplink signals within T1 and T2 time periods or a single receiver 118 may be used to receive both uplink signals 112, 114.

At step 506, it is determined whether an uplink signal within the T1 time periods (originating time periods) has been detected. Using the wireless communication device IDs, the target transceiver node attempts to receive the uplink wireless signals 112. If an uplink signal 112 is demodulated and decoded to determine that identify of the wireless communication device transmitting the uplink signal, the uplink signal 112 is determined to be detected. If an uplink signal 112 has been detected, the procedure continues to step 508. Otherwise, the procedure returns to step 504 to continue monitoring the originating time periods.

At step 508, the proximity of the wireless communication device 106 to the target transceiver node is determined. Although any of various techniques may be used to determine the distance between the wireless communication device 106 and the target transceiver node 104, the proximity is calculated, or at least estimated, by comparing the received signal strength to a threshold. If the signal strength is above the threshold, the wireless communication device is determined to likely be within the target geographic service area and likely able to receive wireless service. Accordingly, for the example, if the signal strength is above a threshold, the proximity is determined to be less than a certain threshold distance.

At step 510, it is determined whether a device proximity message 116 should be sent. Any of numerous criteria may be applied to determine whether the message 116 should be sent. For the example, estimated or calculated proximity is compared to a proximity threshold. If the proximity is less than the threshold, it is determined that the device proximity message 116 should be sent. The method proceeds to step 512 if the message 116 is to be sent. Otherwise, the method returns the step 504.

At step 512, the device proximity message is sent. In the example, the device proximity message is transmitted to the originating transceiver node over an X2 link. If a direct link to the originating transceiver node 102 is not available, the device proximity message is sent to the core network over 108 an S1 link which invokes transmission of another S1 message from the core network 108 to the originating transceiver node 102. In response to the device proximity message 116, the originating transceiver node 102 determines if a handover is warranted. In some implementations, the device proximity message 116 is sent to the core network 108 for processing by the MME or other entity to determine if a handover should be performed.

Figure 6:
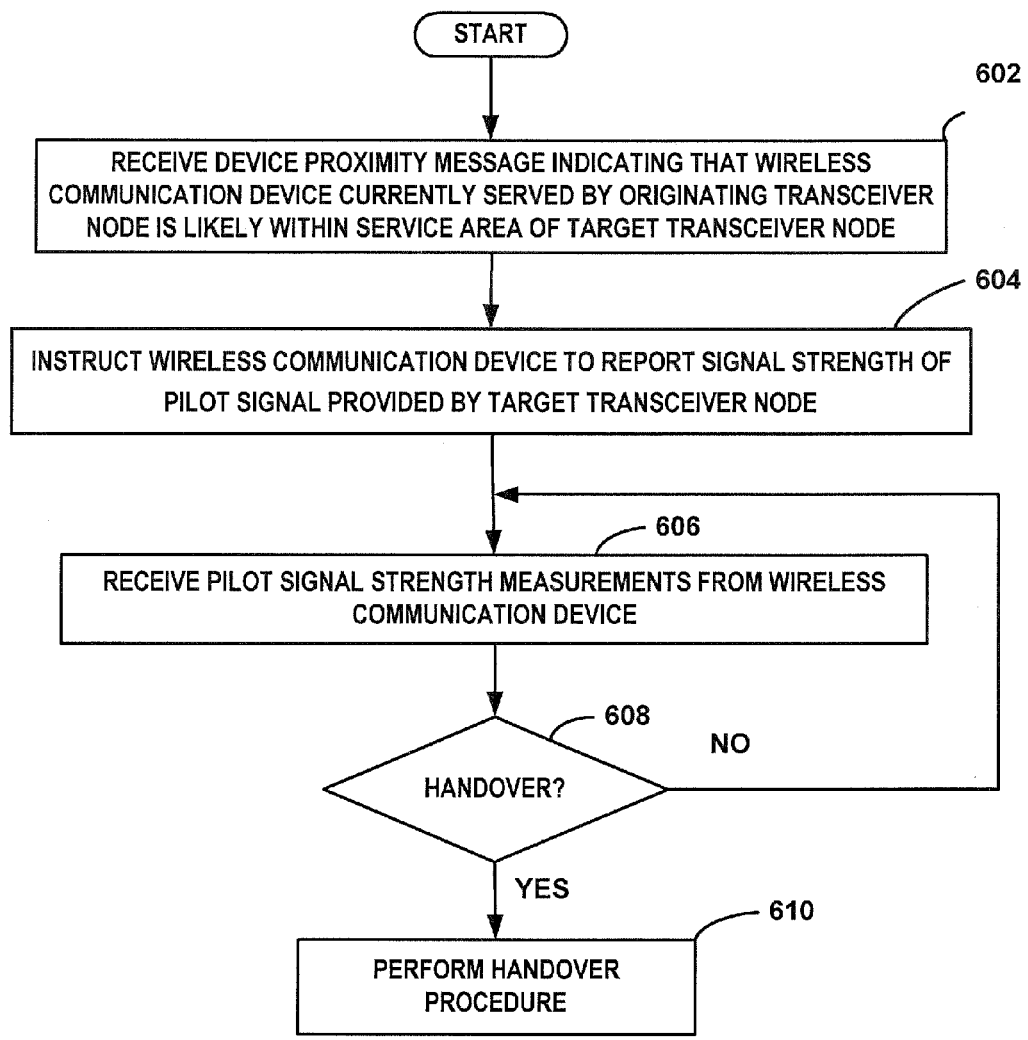
FIG. 6 is a flow chart of a method performed at an originating transceiver node.

FIG. 6 is a flow chart of a method performed at an originating transceiver node 102. The method may be performed by any combination of software, firmware, and/or hardware. In some circumstances, the steps described in the flow chart may be performed in a different order than shown and two or more steps may be combined in a single step.

At step 602, the originating transceiver node 102 receives the device proximity message 116. The device proximity message 116 at least identifies a wireless communication device 106 that is candidate for a handover. The device proximity message 116 may more specifically indicate to the originating transceiver node 102 that a wireless communication device 106 currently receiving wireless service form the originating transceiver node 102 has transmitted an uplink signal that has been received by the target transceiver node 104. Accordingly, the device proximity message 116 indicates that the wireless communication device 106 is likely within the target geographical service area 204 of the target transceiver node 104.

At step 604, the wireless communication device 106 identified by the device proximity message 116 is instructed to report a signal strength of the pilot signal provided by the target transceiver node 104. An example of a suitable technique for providing the signal strength includes generating and transmitting a Signal Strength Report from the wireless communication device in accordance with known techniques.

At step 606, the signal strength of pilot signal measured at the wireless communication device 106 is received. The wireless communication device 106 transmits a pilot signal strength report to the originating base station.

At step 608, it is determined whether a handover should be performed. In accordance with known techniques, the controller 310 in the originating transceiver node 102 evaluates the pilot signal strength of the target transceiver node 104, as well as other factors, to determine if a handover should be performed. As part of the evaluation, for example, the pilot signal strength may be compared to a threshold. If it is determined that a handover should be performed, the procedure continues at step 610 where the handover is performed in accordance with known techniques. Otherwise, the procedure returns to step 602. In some situations, the procedure may return to step 606 to continue receiving and evaluating pilot signal strengths.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
    receiving, at a target transceiver node, an uplink signal transmitted from a wireless communication device receiving wireless service from an originating transceiver node, the uplink signal transmitted within originating uplink time periods assigned to the originating transceiver node for receiving uplink signals and non-overlapping with target uplink signal time periods assigned to the target transceiver node for receiving uplink signals from target served wireless communication devices when providing wireless service to the target served wireless communication devices;
    sending a message identifying the wireless communication device, the target transceiver node having a target node geographical service area at least partially overlapping with an originating node geographical service area of the originating transceiver node; and
    at least estimating a proximity of the wireless communication device to the target transceiver node based on the uplink signal, wherein sending the message comprises sending the message when the proximity is below a threshold.

2. The method of claim 1, wherein sending the message comprises sending the message to the originating transceiver node.

3. The method of claim 2, wherein sending the message to the originating transceiver node comprises transmitting an X2 signal in accordance with a 3rd Generation Partnership Project (3GPP) Long Term Evolution (LTE) standard through a communication link between the target transceiver node and the originating transceiver node.

4. The method of claim 2, wherein sending the message to the originating transceiver node comprises transmitting an S1 signal in accordance with a 3rd Generation Partnership Project (3GPP) Long Term Evolution (LTE) standard through a communication link between the target transceiver node and a core network to invoke transmission of another S1 message from the core network to the originating transceiver node.

5. The method of claim 1, further comprising:
    evaluating a pilot signal strength of a pilot signal provided by the target transceiver node and measured by the wireless communication device;
    initiating a handover of the wireless communication device from the originating transceiver node to the target transceiver node if the pilot signal strength is above a threshold.

6. The method of claim 1, wherein the target node geographical service area is positioned completely within the originating node geographical service area.

7. A target transceiver node comprising:
    a receiver configured to receive an uplink signal transmitted from a wireless communication device receiving wireless service from an originating transceiver node, the uplink signal transmitted within originating uplink time periods assigned to the originating transceiver node for receiving uplink signals and non-overlapping with target uplink signal time periods assigned to the target transceiver node for receiving uplink signals from target served wireless communication devices when providing wireless service to the target served wireless communication devices;

a network interface configured to send a message identifying the wireless communication device, the target transceiver node having a target node geographical service area at least partially overlapping with an originating node geographical service area of the originating transceiver node; and a controller configured to at least estimate a proximity of the wireless communication device to the target transceiver node based on the uplink signal, wherein the network interface is configured to send the message only when the proximity is below a threshold.

8. The target transceiver node of claim 7, wherein the network interface is configured to send the message to the originating transceiver node.

9. The target transceiver node of claim 8, wherein the network interface is configured to send the message to the originating transceiver node by transmitting an X2 signal in accordance with a 3rd Generation Partnership Project (3GPP) Long Term Evolution (LTE) standard through a communication link between the target transceiver node and the originating transceiver node.

10. The target transceiver node of claim 8, wherein the network interface is configured to send the message by transmitting an S1 signal in accordance with a 3rd Generation Partnership Project (3GPP) Long Term Evolution (LTE) standard through a communication link between the target transceiver node and a core network to invoke transmission of another S1 message from the core network to the originating transceiver node.

11. A system comprising:
an originating transceiver node configured to provide wireless service to a wireless communication device within an originating geographical service area;

a target transceiver node having a target node geographical service area at least partially overlapping with an originating node geographical service area of the originating transceiver node, the target transceiver node comprising:
a receiver configured to receive an uplink signal transmitted from the wireless communication device receiving wireless service from the originating transceiver node, the uplink signal transmitted within originating uplink time periods assigned to the originating transceiver node for receiving uplink signals and non-overlapping with target uplink signal time periods assigned to the target transceiver node for receiving uplink signals from target served wireless communication devices when providing wireless service to the target served wireless communication devices;
a network interface configured to send a message identifying the wireless communication device; and
a controller configured to at least estimate a proximity of the wireless communication device to the target transceiver node based on the uplink signal, wherein the network interface is configured to send the message only when the proximity is below a threshold.

12. The system of claim 11, wherein the network interface is configured to send the message to the originating transceiver node.

13. The system of claim 12, wherein the network interface is configured to send the message to the originating transceiver node by transmitting an X2 signal in accordance with a 3rd Generation Partnership Project (3GPP) Long Term Evolution (LTE) standard through a communication link between the target transceiver node and the originating transceiver node.

14. The system of claim 12, wherein the network interface is configured to send the message by transmitting an S1 signal in accordance with a 3rd Generation Partnership Project (3GPP) Long Term Evolution (LTE) standard through a communication link between the target transceiver node and a core network to invoke transmission of another S1 message from the core network to the originating transceiver node.

* * * * *